Figures 1, 2, 3:
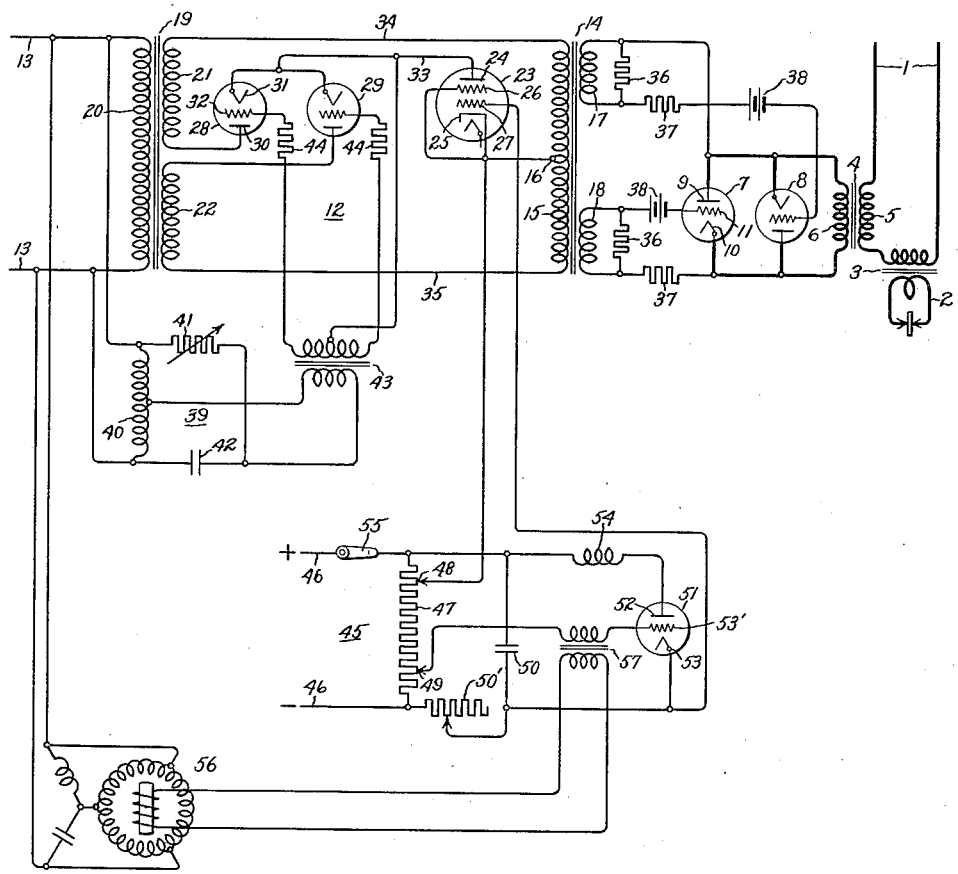

May 28, 1940.  G. W. GARMAN  2,202,732

ELECTRIC TRANSLATING APPARATUS

Original Filed April 24, 1937

Inventor:
George W. Garman,
by Harry E. Dunham
His Attorney.

Patented May 28, 1940

2,202,732

UNITED STATES PATENT OFFICE 2,202,732

ELECTRIC TRANSLATING APPARATUS

George W. Garman, Scotia, N. Y., assignor to General Electric Company, a corporation of New York Application April 24, 1937, Serial No. 138,817
Renewed October 10, 1939

12 Claims. (Cl. 250—27)

My invention relates to electric translating apparatus and more particularly to electric valve circuits.

In the control of electric valve apparatus, particularly in the control of electric valve apparatus of the type employing an ionizable medium such as a gas or a vapor, it is frequently desirable to furnish voltages of perpendicular wave front to control the electric valve apparatus. By impressing voltages of perpendicular wave front on the control members of electric valves, it is possible to effect precise and positive control of electric valve means. Furthermore, it is important to control electric circuits by electric valve apparatus to effect energization of an associated load circuit during a predetermined interval of time and to control the amount of energy transmitted during the interval. Heretofore to accomplish these results it has been necessary to employ complicated apparatus of inordinate proportions relative to the size and rating of the equipment to be controlled. In view of these factors, there has been evidenced a decided need for control apparatus for performing these functions which is simple in construction and arrangement and which is susceptible of great flexibility and precision of control.

It is an object of my invention to provide a new and improved control circuit.

It is another object of my invention to provide a new and improved electric valve circuit.

It is a further object of my invention to provide a new and improved control system for electric valve translating apparatus.

In accordance with the illustrated embodiment of my invention, I provide a new and improved control circuit for electric valve apparatus. The control circuit includes an arrangement for controlling the transfer of energy between circuits whereby the period of energization and the amount of energy transfer during the period may be accurately and precisely controlled. Electric valves having control members are used to effect this control and the control circuit includes an inductive device, such as a transformer, and a pair of electric circuits for energizing the transformer to induce in the secondary winding thereof an alternating voltage which impresses suitable alternating voltages on the control members of the electric valves. A pair of electric valves is connected in the circuits to control the phase relation and the wave form of the alternating voltage impressed on the control members, and other electric valve means is employed to control the period of energization of the control members and thereby to effect control of the period of energy transfer.

For a better understanding of my invention, reference may be had to the following description taken in connection with the accompanying drawing, and its scope will be pointed out in the appended claims. Fig. 1 of the accompanying drawing diagrammatically shows an embodiment of my invention as applied to an electric valve translating circuit for effecting periodic energization of an associated load circuit and Figs. 2 and 3 represent certain operating characteristics thereof.

Referring to Fig. 1 of the drawing, my invention is diagrammatically shown as applied to an electric valve translating circuit for transmitting energy from an alternating current supply circuit 1 to a load circuit, such as a welding circuit 2, through a transformer 3. A suitable circuit controlling means such as an inductive device or transformer 4 having a primary winding 5 and a secondary winding 6 may be connected in series relation with the circuit 1 and the transformer 3 to control the amount of energy transmitted to the welding circuit 2. A pair of electric valves 7 and 8, which may be connected reversely in parallel, are connected across the secondary winding 6 of transformer 4 to control the effective impedance of the primary winding 5, thereby effecting control of the amount of energy transmitted to the welding circuit 2 from the supply circuit 1. Each of the electric valves 7 and 8 includes an anode 9, a cathode 10 and a control member 11 and are preferably of the type employing an ionizable medium such as a gas or a vapor.

To control the conductivities of the electric valves 7 and 8 to render these valves conductive for a predetermined interval of time and to control the amount of energy transmitted to the welding circuit 2 from the supply circuit 1 during the interval of time, I provide a circuit 12 including a source of alternating current 13, a suitable inductive device, such as a transformer 14 having a primary winding 15 with an electrically intermediate connection 16 and secondary windings 17 and 18, and a transformer 19 having a primary winding 20 and secondary windings 21 and 22. While in the arrangement diagrammatically shown in Fig. 1 the circuit 12 is shown as being energized from an alternating current circuit 13, it is to be understood that I may employ any source of alternating current properly correlated in phase and frequency relative to the voltage of the alternating current circuit 1, and that I may connect the circuit 12 to circuit 1 if desired. The circuit 12 includes an electric valve 23, having an anode 24, a cathode 25 and control members 26 and 27, which is preferably of the type employing an ionizable medium such as a gas or a vapor and which controls the period of energization of the welding circuit 2 from the alternating current circuit 1. Cathode 25 of electric valve 23 is connected to the electrically intermediate connection 16 of primary winding 15 of transformer 14. Electric valve means 28 and 29 are associated with secondary windings 21 and 22, respectively, of transformer 19. Each of the electric valves 28 and 29 is provided with an anode 30, a cathode 31 and a control member 32. The cathodes 31 of these electric valves are connected to anode 24 of electric valve 23 through a conductor 33. Secondary windings 21 and 22 of transformer 19 are also connected to primary winding 15 of transformer 14 through conductors 34 and 35, respectively. Secondary windings 21 and 22 taken in connection with the associated electric valves 28 and 29 and the common electric valve 23 constitute a pair of electric circuits which alternately energize primary winding 15 of transformer 14 in opposite directions to induce in the secondary windings 17 and 18 of transformer 14 alternating voltages of predetermined duration and predetermined wave form. Electric valves 28 and 29 also serve to control the time during the respective half cycles of applied voltage at which the circuits initiate the conduction of current through the primary winding 15 of transformer 14. Resistances 36 are connected across secondary windings 17 and 18 of transformer 14 and serve to impose a predominantly resistive load on these secondary windings, and current limiting resistances 37 are employed to control the current supplied to the control members 11 of electric valves 7 and 8. Suitable sources of negative unidirectional biasing potential, such as batteries 38, are connected in circuit with control members 11 of electric valves 7 and 8.

To control the time during each positive half cycle of voltage applied to electric valves 28 and 29 at which these valves are rendered conductive, I employ a suitable circuit such as an impedance phase shifting circuit 39 including an inductive device 40 for providing an alternating voltage and a voltage of intermediate value, an adjustable resistance 41, a capacitance 42 and a transformer 43. Current limiting resistances 44 are connected in series relation with the output circuit of the transformer 43. The phase shifting circuit 39, acting in conjunction with electric valves 28 and 29, serves as an agency for controlling the amount of energy transferred to the welding circuit 2 from the alternating current circuit 1. This control is effected by controlling the phase positions of the voltages impressed on control members 11 of electric valves 7 and 8 by secondary windings 17 and 18 of transformer 14 relative to the alternating voltages impressed on anodes 9 of electric valves 7 and 8 by secondary winding 6 of transformer 4. Furthermore, by retarding the phase of the voltages impressed on control members 32 of electric valves 28 and 29, the alternating voltages impressed on control members 11 of electric valves 7 and 8 are of perpendicular wave front to effect precise control of electric valves 7 and 8. By the adjustment of the resistance 41, the phase of the alternating voltage impressed on control members 32 of electric valves 28 and 29 may be controlled relative to the voltage impressed on the associated anodes 30. Although the phase shifting circuit 39 is shown as being connected to the alternating current circuit 13, it is to be understood that the circuit 39 may be connected to the circuit 1 or to any other suitable source of alternating current correlated in phase and frequency relative to the voltage of circuit 1.

I employ a suitable timing circuit 45 for providing a periodic voltage for energizing control member 27 of electric valve 23 to render this valve conductive periodically. Control member 26 of electric valve 23 may be connected to cathode 25 or to any potential less positive than that of anode 24. The circuit 45 may comprise a source of unidirectional potential 46, a voltage divider including a resistance 47 having adjustable taps 48 and 49, a capacitance 50 which is charged from source 46 through an adjustable resistance 50' and an electric valve 51 for periodically discharging the capacitance 50. Electric valve 51 includes an anode 52, a cathode 53 and a control member 53', and is preferably of the type employing an ionizable medium such as a gas or a vapor. An inductance 54 is connected in series with electric valve 51 to assist in periodically rendering the valve nonconductive and a suitable circuit controlling means such as a switch 55 may be connected in circuit 45. A circuit including any conventional phase shifting arrangement, such as a rotary phase shifter 56 and a transformer 57, may be used to render electric valve 51 conductive at the proper predetermined times to effect the desired correlation with the voltages of circuits 1 and 13. Transformer 57 may be of the type designed to furnish an alternating voltage of peaked wave form.

Although circuit 12 is shown as comprising a part of a control system for other electric valve apparatus, it is to be understood that my invention in its broader aspects may be employed as an electric valve translating circuit where it is desired to effect energization of an associated load circuit which could be connected to secondary windings 17 or 18 of transformer 14. Furthermore, it is to be understood that it may be desirable to employ only one of the circuits of circuit 12 to supply only unidirectional impulses of voltage to a load circuit and to control the amount of energy transmitted to the load circuit. This result may be effected by employing only one of the controlled rectifiers, such as electric valve 28, electric valve 23 and the associated secondary winding 21 of transformer 19 to induce trains of unidirectional periodic impulses in secondary windings 17 and 18, each train including a predetermined number of voltage impulses.

The operation of the embodiment of my invention diagrammatically shown in Fig. 1 of the accompanying drawing will be explained when the arrangement thereof is effecting periodic energization of the welding circuit 2 from the supply circuit 1 through transformers 3 and 4. Circuit 12 controls the alternating voltages impressed on control members 11 of electric valves 7 and 8 so that these valves control the impedance of primary winding 5 of transformer 4 to control the energy supplied to welding circuit 2. The length of the periods of energization of the welding circuit 2 and the periodicity of such energizations are controlled by electric valve 23 and timing circuit 45, and the amount of energy transmitted during the periods is controlled by electric valves 28 and 29 and phase shifting circuit 39. Electric valves 28 and 29 and phase shifting circuit 39 control the amount of energy transmitted to circuit 2 from circuit 1 by controlling the phase of the voltages impressed on control members 11 of electric valves 7 and 8 relative to the alternating voltages impressed on the associated anodes 9.

Considering now more particularly the operation of the individual circuits of the system, it will be understood that when the voltages impressed on control members 11 of electric valves 7 and 8 are in phase with the voltages impressed on the associated anodes, the impedance of primary winding 5 of transformer 4 will be minimum, and when there is substantial phase opposition between these voltages the impedance of winding 5 will be maximum. For intermediate phase relationships, the impedance of winding 5 will assume corresponding values. In this manner, the energization of welding circuit 2 is controlled.

Circuit 12, by virtue of the two circuits including secondary windings 21 and 22, electric valves 28 and 29 and electric valve 23, energizes transformer 14 to induce alternating voltages variable in phase and of controllable wave form in secondary windings 17 and 18. The two circuits conduct current alternately to energize primary winding 15 of transformer 14 in opposite directions to induce in secondary windings 17 and 18 the desired alternating voltages. For example, during a half cycle of voltage of one polarity the upper half of primary winding 15 of transformer 14 will be energized through a circuit including secondary winding 21 of transformer 19, and electric valves 28 and 23. During the next half cycle of opposite polarity, the lower half of primary winding 15 will be energized through a circuit including secondary winding 22 of transformer 19, and electric valves 29 and 23. Since these energizations of primary winding 15 are in opposite directions, alternating voltages will be induced in secondary windings 17 and 18.

The period of energization of transformer 14 and the interval between the periods of energization are controlled by electric valve 23 and the timing circuit 45. Circuit 45 generates a periodic voltage, the period of which may be controlled by adjusting resistance 50', and the ratio of "time-on" to "time-off" may be controlled by adjusting tap 48 of resistance 47. The periodic voltage furnished by timing circuit 45 is impressed on control member 27 to render electric valve 23 periodically conductive.

The operation of the illustrated embodiment of my invention will be better understood by considering the operating characteristics shown in Fig. 2. The curves of Fig. 2 may represent the rectified alternating voltage impressed on electric valve 23 by secondary windings 21 and 22 and electric valves 28 and 29 during one period of energization corresponding to two cycles of voltage of circuit 1. By adjusting phase shifting circuit 39, electric valves 28 and 29 may be rendered conductive at approximately the maximum values of the impressed voltage as represented by points $a$, $b$, $c$ and $d$, so that electric valve 23 conducts current during the intervals represented by the solid curves A, B, C and D. During the intervals represented by the broken curves, no current is transmitted. This train of voltage impulses impressed on primary winding 15 of transformer 14 induces in secondary windings 17 and 18 alternating voltages having a wave form as represented by curve E of Fig. 3. By controlling the voltage impressed on primary winding 15, the amount of energy transmitted to the secondary windings 17 and 18 is controlled, and the amount of energy transmitted to welding circuit 2 from supply circuit 1 is also controlled. The maximum consecutive number of half cycles of voltage in each train induced in secondary windings 17 and 18 is controlled by electric valve 23. The non-conducting intervals, as represented by the broken curves, afford an interval in which the control member 27 of electric valve 23 may gain control.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent in the United States is:

1. In combination, an alternating current circuit, a second alternating current circuit, electric translating apparatus interconnecting said alternating current circuits and including a pair of electric circuits arranged to conduct current alternately to transmit energy from said first mentioned circuit to said second circuit, a pair of electric valves each having a control member and each connected in a different one of said pair of circuits, an electric valve means connected in series relation with said pair of electric valves to control the period during which energy is transmitted by said pair of circuits, and means for energizing said control members to control the amount of energy transmitted by said pair of circuits during said period.

2. In combination, an alternating current supply circuit, a second circuit, and electric translating apparatus interconnecting said circuits comprising an inductive device having a primary winding and a secondary winding connected to said second circuit, a pair of electric circuits connected to said primary winding for transmitting current alternately and arranged to induce an alternating voltage in said secondary winding, a pair of controlled rectifiers each connected in a different one of said pair of circuits to control the part of each half cycle of the voltage of said supply circuit during which said pair of circuits transmit current and an electric valve means connected in series relation with said pair of controlled rectifiers to control the period of energization of said second circuit.

3. In combination, an alternating current supply circuit, a second circuit, and electric translating apparatus interconnecting said circuits comprising a transformer having a primary winding and a secondary winding connected to said second circuit, a pair of electric circuits energized from said supply circuit and being connected to said primary winding, said pair of electric circuits being arranged to conduct current alternately and each including an electric valve for controlling the time during each positive half cycle of impressed voltage at which current conduction is initiated, and an electric valve connected in said pair of of circuits for controlling the number of consecutive half cycles of voltage induced in said secondary winding.

4. In combination, an alternating current supply circuit, a second circuit, a transformer having a primary winding and a secondary winding connected to said second circuit, and means for energizing said primary winding to induce in said secondary winding an alternating voltage of perpendicular wave front including a pair of electric circuits energized from said supply circuit and arranged to energize said primary winding alternately in opposite directions, a pair of electric valves each connected in a different one of said pair of circuits and each having an anode, a cathode and a control member for controlling the conductivity thereof, a circuit for impressing on the control members a control voltage to render the electric valves conductive within the region of the maximum value of impressed anode voltage, and an electric valve connected in series relation with said pair of electric valves to control the number of half cycles of voltage impressed on said second circuit.

5. In combination, an alternating current supply circuit, a second circuit, a transformer having a primary winding and a secondary winding connected to the second circuit, a pair of circuits interposed between said supply circuit and said primary winding, a pair of electric valves each connected in a different one of said pair of circuits and arranged to conduct current alternately to energize said primary winding in opposite directions to induce an alternating voltage in said secondary winding, means for controlling said pair of electric valves to impress on said primary winding an alternating voltage of perpendicular wave front, an electric valve connected in series relation with said pair of electric valves, and a circuit for supplying a periodic timing quantity to render said last mentioned electric valve conductive for a predetermined time to effect energization of said second circuit for a corresponding interval of time.

6. In an excitation circuit for an electric valve means having a control member, the combination of a source of alternating current, a transformer having a primary winding and a secondary winding connected to said control member, a pair of electric circuits interposed between said source and said primary winding and arranged to conduct current alternately to energize said primary winding in opposite directions to induce an alternating voltage in said secondary winding, an electric valve connected in said pair of circuits to control the period of energization of said primary winding and a pair of controlled rectifiers each connected in a different one of the pair of electric circuits for controlling the wave shape of the alternating voltage induced in said secondary winding.

7. In combination, an alternating current supply circuit, a second circuit, electric translating apparatus interconnecting said circuits and including a pair of electric circuits arranged to conduct current alternatively to transmit energy from said supply circuit to said second circuit, a pair of electric valves each having a control member and each being connected in a different one of said pair of circuits, an electric valve means connected in series relation with said pair of electric valves to control the period during which said second circuit is energized, and means for impressing on the control members of said pair of electric valves alternating voltages variable in phase relative to the voltage impressed across said electric valves to control the wave form of the voltage impressed on said second circuit.

8. In combination, an alternating current supply circuit, a load circuit, an electric valve means interposed between said circuits for controlling the transfer of energy therebetween and being provided with a control member for controlling the conductivity thereof, and an excitation circuit for energizing said control member including a source of alternating current, a transformer having a primary winding and a secondary winding connected to said control member, a pair of electric circuits interconnecting said source and said primary winding, a pair of electric valves each connected in a different one of said pair of circuits and arranged to conduct alternately to energize said primary winding in opposite directions to induce an alternating voltage in said secondary winding, an electric valve connected in series relation with said pair of electric valves to control the period of energization of said control member and means for controlling said pair of electric valves to control the amount of energy transmitted from said supply circuit to said load circuit during said period of energization.

9. In combination, an alternating current supply circuit, a load circuit, an electric valve means interposed between said circuits for controlling the transfer of energy therebetween and being provided with a control member for controlling the conductivity thereof, and an excitation circuit for energizing said control member including a source of alternating current, a transformer having a primary winding and a secondary winding connected to said control member, a pair of electric circuits interconnecting said source and said primary winding, a pair of electric valves each connected in a different one of said pair of circuits and arranged to conduct alternately to energize said primary winding in opposite directions to induce an alternating voltage in said secondary winding, an electric valve connected in series relation with said pair of electric valves to control the maximum consecutive number of half cycles of voltage impressed on said control member, and means for controlling the conductivities of said pair of electric valves to control the phase relation of the voltage impressed on said control member relative to the voltage of said supply circuit to control the current supplied to said load circuit.

10. In combination, an alternating current supply circuit, a load circuit, an electric valve means interposed between said circuits for controlling the transfer of energy therebetween and being provided with a control member for controlling the conductivity thereof, and an excitation circuit for energizing said control member including a source of alternating current, a transformer having a primary winding and a secondary winding connected to said control member, a pair of electric circuits interconnecting said source and said primary winding, a pair of electric valves each connected in a different one of said pair of circuits and arranged to conduct alternately to energize said primary winding in opposite directions to induce an alternating voltage in said secondary winding, means for controlling said pair of electric valves to control the wave form of the voltage impressed on said control member and an electric valve connected in series relation with said pair of electric valves to control the maximum consecutive number of half cycles of voltage impressed on said control member.

11. In combination, an alternating current supply circuit, a load circuit, electric valve means interposed between said circuits, said electric valve means having a control member for controlling the conductivity thereof, and an excitation circuit for impressing on said control member trains of periodic voltage impulses comprising a source of alternating current, an inductive device for energizing said control member, a serially connected rectifier and an electric valve for energizing said inductive device from said source, means for controlling said second mentioned electric valve to render said valve conductive periodically and means for controlling the conductivity of said rectifier to control the phase of the voltage impulses relative to the voltage impressed across said electric valve means to control the energy transmitted to said load circuit.

12. In combination, an alternating current supply circuit, a load circuit, electric translating apparatus interconnecting said circuits and comprising a pair of electric circuits each including a rectifier, a unitary electric valve means connected in series relation with both rectifiers in said pair of circuits, said electric valve means having a control member for controlling the conductivity thereof, means for impressing on said control member a potential to render said electric valve means conductive for a predetermined number of consecutive half cycles of said supply circuit, and means for controlling the conductivity of the rectifiers to control the energy transmitted from said supply circuit to said load circuit during said half cycles.

GEORGE W. GARMAN.